Sept. 3, 1968  J. D. VAN BENTHUYSEN ET AL  3,400,355
VARIABLE RESISTANCE CONTROL WITH IMPROVED HEAT
DISSIPATOR ARRANGEMENT AND BEARING MEANS
Filed Dec. 2, 1966
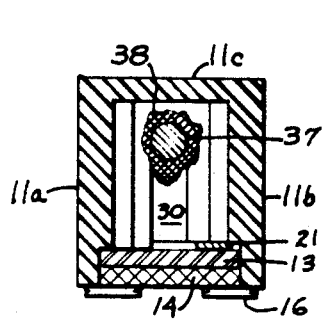
FIGURE-3
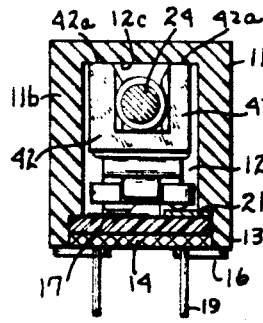
FIGURE-4
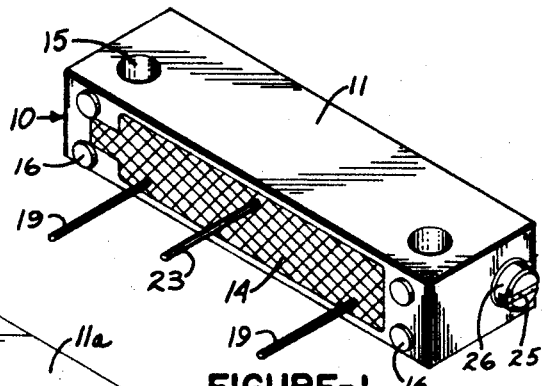
FIGURE-1
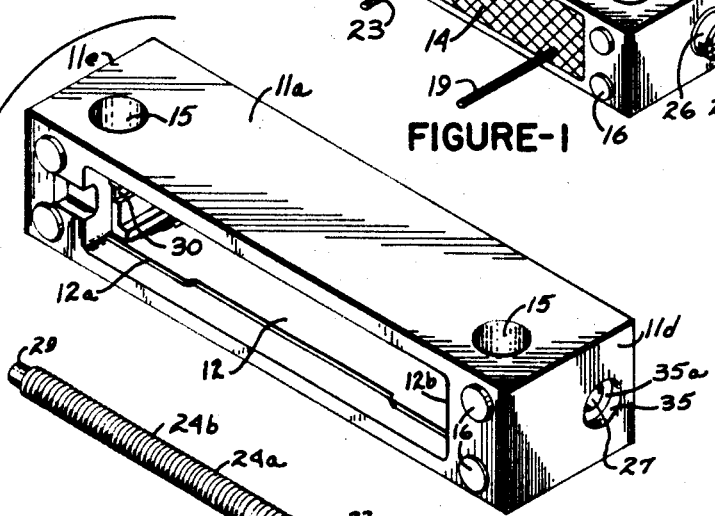
FIGURE-5
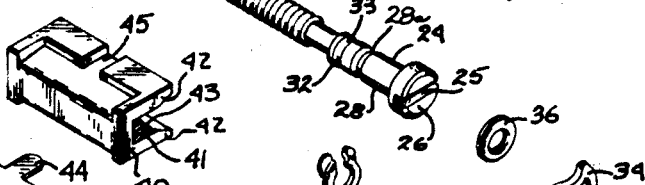
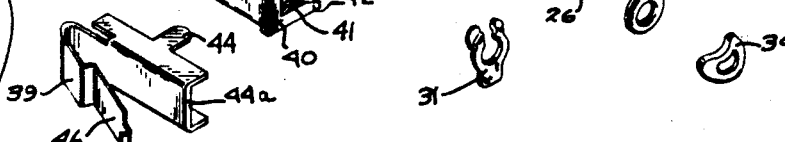
FIGURE-2
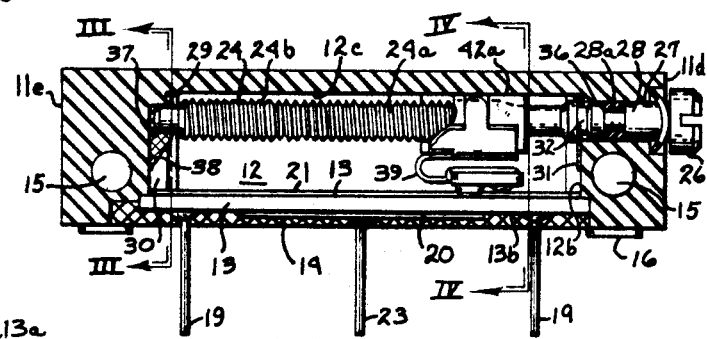
INVENTORS
JOHN D. VAN BENTHUYSEN
MERVIN B. ARISMAN
BY John J. Gaydos
ATTORNEY

United States Patent Office 3,400,355
Patented Sept. 3, 1968

3,400,355
VARIABLE RESISTANCE CONTROL WITH IMPROVED HEAT DISSIPATOR ARRANGEMENT AND BEARING MEANS
John D. Van Benthuysen and Mervin B. Arisman, Elkhart, Ind., assignors to CTS Corporation, Elkhart, Ind., a corporation of Indiana
Filed Dec. 2, 1966, Ser. No. 598,712
10 Claims. (Cl. 338—183)

ABSTRACT OF THE DISCLOSURE

Variable resistance control having a journaled shaft rotatably mounted in a housing. Body of epoxy is formed in situ around at least one journal of the shaft, the body of epoxy adhering to the housing and forming an end thrust bearing rotatably supporting the shaft and limiting inward axial movement of the shaft. The housing is provided with a cavity closed by a substrate supporting a resistance element and a collector. The collector includes a heat dissipator disposed outwardly of the housing that facilitates removal of heat from the resistance element by uniformly distributing heat over the substrate. A U-shaped driver engaging the shaft carries a U-shaped member having a contactor wipably engaging the resistance element and the collector intermediate the ends thereof. The U-shaped member is provided with first and second tension means in the form of a pair of arms for biasing first and second legs of the U-shaped driver against diametrically opposite sides of the shaft in order to control rotational torque of the shaft. A clutching action between the shaft and the U-shaped driver is obtained as a result of resilient engagement of the shaft by the driver.

---

The present invention relates to resistance controls and, more particularly, to a rectilinear variable resistance control.

Cermet rectilinear variable resistance controls have a thick film resistance element and a collector secured onto a substrate in spaced parallel relationship. During operation of the control and, as a driver wipes the resistance element and the collector, heat is generated by the resistance element. The rate of removal of this heat from the substrate limits the allowable power rating of the control. It would, therefore, be desirable to provide a variable resistance control with a heat dissipator to increase the rate of removal of heat from the resistance element.

The rotatable shaft of a variable resistance control for moving the driver rectilinearly of the resistance element generally has a pair of journals supported in radial bearings provided in the housing of the control. Such bearings do not, however, prevent axial movement of the shaft resulting in movement of the contactor and changing the ohmic resistance of the control when a tool is operably connected and disconnected to one end of the shaft. It would, therefore, also be desirable to eliminate axial movement of the shaft of a variable resistance control.

Inadvertent movement of a contactor wipably engaging the resistance element and the collector is prevented by making the rotational torque of the shaft greater than any of the external forces that the control will encounter. The magnitude of the external forces depends upon the application of the control, for example, a control employed in a missile requires a much higher rotational torque than a control employed in ground equipment. Generally rotational torque is altered by changing certain parts in a control. It would, therefore, be desirable to alter rotational torque of a control without changing parts thereof and also to provide means for maintaining the same torque throughout the life of the control.

Accordingly, it is an object of the present invention to provide a new and improved rectilinear variable resistance control. Another object of the present invention is to provide a control with improved means for eliminating axial movement of a shaft. An additional object of the present invention is to provide a control with improved heat dissipation. Still another object of the present invention is to provide a control with improved means for altering rotational torque. A further object of the present invention is to provide a control with a heat dissipator integral with a collector. Further objects and advantages of the present invention will become apparent as the following description proceeds and the features of novelty characterizing the invention will be pointed out with particularity in the claims annexed to and forming a part of the specification.

Briefly, the present invention is concerned with a rectilinear variable resistance control comprising a housing provided with a cavity. A substrate supporting a resistance element and a collector closes the cavity. A U-shaped driver engaging a shaft rotatably mounted in the housing carries a U-shaped member having a contactor wipably engaging the resistance element and the collector intermediate the ends thereof. A heat dissipator secured to the substrate and disposed outwardly of the housing facilitates removal of heat from the resistance element by uniformly distributing heat over the substrate. Preferably the heat dissipator is integral with the collector and the center terminal is secured to the dissipator. Axial movement of the shaft is eliminated by an epoxy bearing formed in situ around the end journal of the shaft. Rotational torque for producing clutching action and rotation of the shaft is altered by changing the angle of preform of the arms of the U-shaped member biased against the legs of the driver.

For a better understanding of the present invention, reference may be had to the accompanying drawings wherein the same reference numerals have been applied to like parts and wherein: FIGURE 1 is an enlarged isometric view of a rectilinear variable resistance control built in accord with the present invention; FIGURE 2 is a sectional view of the control shown in FIGURE 1; FIGURES 3 and 4 are sectional views taken along lines III—III and lines IV—IV of FIGURE 2; and FIGURE 5 is an exploded view of the control shown in FIGURE 1.

Referring now to the drawings, there is illustrated a rectilinear variable resistance control, generally indicated at 10, comprising a housing 11, provided with a cavity 12. The cavity is closed by a flat rectangular base or substrate 13 of ceramic material such as alumina or steatite secured to the housing and hermetically sealed to prevent water and other foreign matter from entering the housing by a layer 14 of epoxy flush with the bottom surface of the housing. The inner edge of the cavity 12 is recessed forming a shoulder 12a abutting against the substrate. The width of the recess formed by the shoulder 12a is slightly greater than the thickness of the substrate to provide suffiicent space for the layer 14 of epoxy.

Considering further the housing 11, it comprises a single rectangular molded member of suitable molding material such as diallyl phthalate resin defined by a pair of parallel side walls 11a, 11b, a top wall 11c and a pair of end walls 11d and 11e. Openings 15 provided in the parallel side walls 11a and 11b extend through the housing facilitating mounting of the control 10. For printed circuit mounting, a plurality of feet 16 depend from the housing spacing the control from a mounting panel. A resistance element 17 is deposited on the inner surface 13a of the substrate 13 and a pair of conductive pads 18 (see FIGURE 5) in overlapping relationship with the ends of the resistance element connect the resistance element to a pair of terminals 19 fixedly secured to the substrate in a suitable manner. A heat dissipator 20 abutting against the outer surface 13b of the substrate 13 rapidly distributes heat generated by the resistance element over a greater portion of the substrate permitting operation of the resistance element 17 at a higher wattage. Since the resistance element 17 is deposited as a narrow strip only over a small portion of the substrate 13, the temperature differential over the bottom of the substrate is not very uniform. By placing a heat dissipator in direct contact with the bottom of the substrate, the heat generated by the resistance element is more uniformly distributed over the bottom of the substrate. Bonding the heat dissipator to the substrate with a conductively filled epoxy improves the rate of flow of heat to the dissipator. Preferably the heat dissipator 20 is integral with a collector 21 disposed on a first or inner surface 13a of the substrate in spaced parallel relationship to the resistance element. A connecting strip 22 joining the dissipator 20 to the collector 21 is received in a recessed section or elongated slot 13c (see FIGURE 5) provided in the substrate. Thus the portion of the heat dissipator identified as connecting strip 22 extends across a side surface of the substrate contiguous with the first or upper surface 13a of the substrate and a second or outer surface 13b of the substrate opposite the first surface. By making the heat dissipator and the collector of metal, e.g., brass, as an integral part, assembly of the dissipator and collector to the base is facilitated. Depending upon the number of watts to be dissipated, the length, width, thickness and surface configuration of the heat dissipator can be readily altered. A center terminal 23 attached to the heat dissipator in a suitable manner such as by welding enables the heat dissipator to function as an electrode connecting the collector to the center terminal extending outwardly of the housing.

Adjustment of the control is obtained by rotating a shaft 24 with a tool insertable into a slot 25 provided in the head 26 of the shaft. The shaft preferably is provided with a threaded section 24a. The shaft 24 extends through an aperture 27 in the end wall 11d and, as best shown in FIGURES 2 and 5, the shaft has a front journal 28 supported in the aperture 27 and an end journal 29 supported in a groove 30 communicating with the cavity 12. Outward axial movement of the shaft 24 is limited by a retaining means, e.g., a U-shaped collar 31 straddling a reduced diameter 32 in a groove 33 adjacent to the journal 28 and abutting against the inner face 12b of the cavity. Spring means such as a spring washer 34 compressed between the head 26 of the shaft 24 and the circumferential shoulder 35a of a recess 35 in the end wall 11d biases the shaft axially outwardly of the housing. Extending around a medial groove 28a formed in the journal 28 is an annular O-ring 36 compressed against the inner surface of the aperture 27 effecting a hermetic seal. Axial movement of the end journal in the groove 30 is eliminated by forming an epoxy bearing 37 in situ by placing a body 38 of uncured epoxy in the groove around the end journal. Preferably the end journal 29 is lubricated before applying the body of epoxy therearound. After the epoxy bearing has set and hardened, the end journal 29 is readily freed by rotating the shaft 24. The body of epoxy, adhering to the housing, thus forms an end thrust bearing that limits inward axial movement of the shaft 24 and rotatably supports the shaft.

As best seen in FIGURES 2 and 5, a contactor 39 including a tension means biased against a U-shaped driver 40 of flexible dielectric material having a bight portion 41 and a pair of legs 42 is carried by the shaft. The ends 42a of the legs (see FIGURES 2 and 4) engage the ceiling 12c of the cavity 12 preventing rotation of the driver around the axis of the shaft. The contactor 39 electrically connects the resistance element 17 to the center terminal 23. It is preferable that rectilinear motion of the contactor engaging the resistance element and the collector be arrested as the contactor approaches the ends thereof to avoid damage to the control. To this end, as the driver 40 abuts an inner end wall of the cavity, continued rotation of the shaft forces the legs 42 to spread slightly causing a clutching action between the driver 40 and the threaded section of the shaft. More specifically, a clutching action is obtained by reason of the resilient engagement of the shaft 24 by the driver 40 and the thread 24b of the shaft 24 disengages from a plurality of spaced ridges 43 formed along the inner faces of the legs 42. The ridges 43 are disposed at a small angle parallel to the pitch of the thread 24b in order to snap sharply over the thread 24b and give a distinct audible sound of the clutching action. Preferably, the bight portion 41 is unthreaded to prevent hopping of the driver 40 toward the substrate during the clutching action.

The contactor comprises first and second tension means in the form of a pair of upwardly extending arms 44 integral with a bridge 44a extending transversely across the bottom surface of the bight portion 41 and biased toward each other for grippingly engaging and biasing the legs of the driver against diametrically opposite sides of the shaft. Preferably the arms 44 are recessed in T-shaped notches 45 provided in the legs 42 of the driver to constrain the contactor 39 to move rectilinearly with the driver and to prevent the arms from engaging the walls of the cavity. The force exerted by the arms 44 against the legs 42 of the driver 40 determines the rotational torque for producing clutching action between the driver and the threaded section 24a of the shaft as well as the rotational torque necessary to rotate the shaft. By altering the preformed angle between the arms 44 and the bridge 44a, rotational torque can readily be changed without the need of employing additional or different parts since the arms 44 operate as first and second tension means biasing the legs 42 toward each other.

As best shown in FIGURE 5, the contactor 39 is generally of U-shaped configuration, the bridge 44a forming one of the legs and the other leg 46 being suitably formed for gripping a rectangular sintered carbon contact block 47 having a pair of contact buttons 48 and 49 wipingly engaging the resistance element 17 and the collector 21 respectively to provide electrical connection therebetween. The contact buttons terminate in different planes to allow for the difference in thickness between the collector and the resistance element. If it is desired to have the top of the collector 21 flush with the inner surface 13a of the substrate 13, the substrate can be appropriately recessed.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. In a variable resistance control having a housing, a substrate secured to the housing, a resistance element supported on a first surface of the substrate, a collector mounted in the housing, and contactor means wipably engaging the resistance element and the collector, the collector comprising a heat dissipator bonded to a second surface of the substrate opposite said first surface, said heat dissipator being disposed against the substrate proximate the resistance element for rapidly distributing heat generated by the resistance element over the substrate.

2. The control of claim 1, wherein a shaft is rotatably supported by the housing, the contactor means is driven by the shaft, the heat dissipator is integral with the collector and a center terminal is connected to the dissipator.

3. The control of claim 2, wherein the collector is mounted on the substrate in spaced relationship to the resistance element, and a portion of the heat dissipator extends across a side surface contiguous with the first surface and the second surface.

4. The variable resistance control of claim 3, wherein said side surface of the substrate is provided with a recessed section, and said portion of the heat dissipator is disposed in the recessed section.

5. The control of claim 3, wherein the contactor means carries a pair of contact buttons wipably engaging the resistance element and the collector, and the contact buttons terminate in different planes.

6. A variable resistance control comprising a housing, a substrate secured to the housing, a resistance element deposited on the substrate, a collector mounted in the housing in spaced relationship to the resistance element, a contactor wipably engaging the resistance element and the collector, a shaft rotatably mounted in the housing, an electrically nonconductive driver having a pair of pivotal legs engaging diametrically opposite sides of the shaft, first tension means biasing one of said pair of legs against the shaft, and second tension means biasing the other of said pair of legs against the shaft, the first and second tension means biasing the pair of legs toward each other for maintaining constant rotational torque of the shaft.

7. The control of claim 6, wherein the first and second tension means comprise a pair of arms biased against the legs of the driver.

8. The control of claim 6, wherein the shaft is provided with a threaded section, the legs of the driver engage the threaded section, a plurality of ridges are formed on the inner faces of the legs, and the ridges are disposed at planes parallel to the pitch of the threaded section.

9. A variable resistance control comprising a housing, a resistance element mounted in the housing, a collector mounted in the housing in spaced relationship to the resistance element, contactor means wipably engaging the resistance element and the collector, a shaft having a pair of journals rotatably mounted in the housing, spring means biasing the shaft axially outwardly of the housing, retaining means limiting outward axial movement of the shaft, and a body of epoxy formed in situ around one of the journals and adhering to the housing, said body of epoxy forming an end thrust bearing rotatably supporting the shaft and limiting inward axial movement of the shaft.

10. The control of claim 9, wherein the housing is provided with a groove, one of the journals is disposed in the groove, and the epoxy bearing is formed in the groove around the journal.

References Cited

UNITED STATES PATENTS

| | | | |
|---|---|---|---|
| 2,201,686 | 5/1940 | Marsten | 338—51 |
| 2,266,188 | 12/1941 | Foley et al. | 338—51 |
| 2,870,302 | 1/1959 | Bourns et al. | 338—183 X |
| 2,946,975 | 7/1960 | Caddock | 338—183 |
| 2,953,763 | 9/1960 | Bourns et al. | 338—183 |
| 2,976,507 | 3/1961 | Girolamo et al. | 338—183 |
| 3,271,722 | 9/1966 | Gurstang | 338—51 X |

ROBERT K. SCHAEFER, *Primary Examiner.*

H. HOHAUSER, *Assistant Examiner.*